(12) United States Patent
Goettmann et al.

(10) Patent No.: US 10,494,695 B2
(45) Date of Patent: Dec. 3, 2019

(54) METHOD OF SELECTIVE EXTRACTION OF PLATINOIDS, FROM A SUPPORT CONTAINING SAME, WITH AN EXTRACTION MEDIUM CONSISTING OF A SUPERCRITICAL FLUID AND AN ORGANIC LIGAND

(71) Applicant: COMMISSARIAT A L'ENERGIE ATOMIQUE ET AUX ENERGIES ALTERNATIVES, Paris (FR)

(72) Inventors: Frédéric Goettmann, Courthezon (FR); Audrey Hertz, Bagnols sur Ceze (FR); Sandrine Mongin, Saint Julien en Genevois (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 217 days.

(21) Appl. No.: 15/506,267

(22) PCT Filed: Sep. 2, 2015

(86) PCT No.: PCT/EP2015/070061
§ 371 (c)(1),
(2) Date: Feb. 24, 2017

(87) PCT Pub. No.: WO2016/034630
PCT Pub. Date: Mar. 10, 2016

(65) Prior Publication Data
US 2017/0253947 A1    Sep. 7, 2017

(30) Foreign Application Priority Data
Sep. 3, 2014 (FR) ..................... 14 58226

(51) Int. Cl.
C22B 3/22      (2006.01)
B22F 9/04      (2006.01)
(Continued)

(52) U.S. Cl.
CPC ........ *C22B 11/048* (2013.01); *B01D 11/0203* (2013.01); *B01D 11/0265* (2013.01);
(Continued)

(58) Field of Classification Search
CPC ....... C22B 11/026; C22B 11/048; C22B 3/22; C22B 7/009; B01D 11/023;
(Continued)

(56) References Cited

U.S. PATENT DOCUMENTS 5,641,887 A    6/1997  Beckman et al.
5,792,357 A    8/1998  Wai et al.
(Continued)

FOREIGN PATENT DOCUMENTS

EP    1547679 A1 *  6/2005    ............. B01J 3/008
EP    1743044 B2    7/2007
(Continued)

OTHER PUBLICATIONS

Evans, Paul. "Density of Gases." The Engineering Mindset, Jul. 26, 2015, theengineeringmindset.com/density-of-gases/. Retrieved Jan. 25, 2019. (Year: 2015).*
(Continued)

*Primary Examiner* — Tina M. McGuthry-Banks
(74) *Attorney, Agent, or Firm* — Pearne & Gordon LLP

(57) ABSTRACT

The present invention relates to a method of selective extraction of a platinoid, from a ceramic support containing a metal, comprising the following successive steps: a) the support is brought into contact, with an extraction medium consisting of a pressurized dense fluid containing an organic ligand that is selective for the metal and that is capable of
(Continued)

forming a complex with the metal in the 0 state; whereby a ceramic support depleted in the metal, or even free of the metal, and, a medium consisting of the fluid containing the complex of the organic ligand with the metal in the 0 state are obtained; b) the fluid is brought back to atmospheric pressure and to ambient temperature, whereby the complex separates from the fluid; c) the ceramic support depleted in the metal, or even free of the metal, and the complex, are recovered.

18 Claims, 6 Drawing Sheets

(51) Int. Cl.
| | |
|---|---|
| *B01D 11/02* | (2006.01) |
| *C22B 7/00* | (2006.01) |
| *C22B 11/02* | (2006.01) |
| *B22F 9/00* | (2006.01) |
| *C22B 3/00* | (2006.01) |

(52) U.S. Cl.
CPC ...... *B01D 11/0288* (2013.01); *B01D 11/0292* (2013.01); *B22F 9/04* (2013.01); *C22B 3/22* (2013.01); *C22B 7/009* (2013.01); *C22B 11/026* (2013.01); *B22F 2009/001* (2013.01); *B22F 2301/25* (2013.01); *B22F 2301/255* (2013.01); *Y02P 10/214* (2015.11)

(58) Field of Classification Search
CPC ............ B01D 11/0265; B01D 11/0288; B01D 11/0203; B01D 11/0292; B22F 9/04; B22F 2009/001; B22F 2301/25; B22F 2301/255

See application file for complete search history.

(56) References Cited

U.S. PATENT DOCUMENTS

| | | | |
|---|---|---|---|
| 5,872,257 A | 2/1999 | Beckman et al. | |
| 6,132,491 A * | 10/2000 | Wai ........................... | B22F 9/24 75/722 |
| 2003/0183043 A1* | 10/2003 | Wai .................... | B01D 11/0203 75/398 |
| 2008/0115627 A1* | 5/2008 | Wang ................ | B01D 11/0203 75/718 |
| 2010/0323527 A1 | 12/2010 | Roberts et al. | |
| 2013/0023713 A1 | 1/2013 | Labe et al. | |
| 2015/0307393 A1 | 10/2015 | Guillot et al. | |
| 2016/0016150 A1 | 1/2016 | El Mourabit et al. | |
| 2016/0050911 A1 | 2/2016 | Ludwig et al. | |
| 2016/0057993 A1 | 3/2016 | Ludwig et al. | |
| 2016/0298060 A1 | 10/2016 | Ludwig et al. | |

FOREIGN PATENT DOCUMENTS

| | | |
|---|---|---|
| JP | 2000515932 | 11/2000 |
| JP | 2004036000 A | 2/2004 |
| JP | 2009057588 A | 3/2009 |
| JP | 2011183262 A | 9/2011 |
| JP | 2011231378 | 11/2011 |
| WO | 9804754 A1 | 2/1998 |
| WO | 2005100621 A1 | 10/2005 |

OTHER PUBLICATIONS

Iwao, Shino et al. "Recovery of palladium from spent catalyst with supercritical CO2 and chelating agent." Journal of Supercritical Fluids 42 pp. 200-204. doi:10.1016/j.supflu.2007.03.010 (Year: 2007).*
Faisal, M. "Innovations in Separations Technology for the Recycling of Rare Metals with Supercritical Carbon Dioxide." The Proceedings of 2nd Annual International Conference Syiah Kuala University 2012 & 8th IMT-GT Uninet Biosciences Conference. Banda Ache. vol. 2, No. 2. pp. 232-235. (Year: 2012).*
Fontas, Claudia et al. "Separation and Concentration of Pd, Pt, and Rh from Automotive Catalytic Converters by Combining Two Hollow-Fiber Liquid Membrane Systems." Ind. Eng. Chem. Res. vol. 41 pp. 1616-1620. doi:10.1021/ie0010468q (Year: 2002).*
Aschenbrenner, O., et al., "Solubility of beta-diketonates, cyclopentadienyls, and cyclooctadiene complexes with various metals in supercritical carbon dioxide", 2007, pp. 179-186, vol. 41, The Journal of Supercritical Fluids.
Iwao, S., et al., "Recovery of palladium from spent catalyst with supercritical CO2 and chelating agent", 2007, pp. 200-204, vol. 42, Journal of Supercritical Fluids.
Li, L., et al., "Ligand-Assisted Extraction for Separation and Preconcentration of Gold Nanoparticles from Waters", 2012, pp. 4340-4349, Journal of Analytical Chemistry.
Park, Y.J., et al., "Recovery of high purity precious metals from printed circuit boards", 2009, pp. 1152-1158, vol. 164, Journal of Hazardous Materials.
Yamini, Y., et al., "Orthogonal array design for the optimization of supercritical carbon dioxide extraction of platinum (IV) and rhenium(VII) from a solid matrix using cyanex 301", 2008, pp. 109-114, vol. 61, Separation and Purification Technology.
Unpublished U.S. Appl. No. 15/129,037, filed Mar. 27, 2015.
Office Action for JP Application No. 2017512374 dated Aug. 22, 2019 and translation thereof.

* cited by examiner

METHOD OF SELECTIVE EXTRACTION OF PLATINOIDS, FROM A SUPPORT CONTAINING SAME, WITH AN EXTRACTION MEDIUM CONSISTING OF A SUPERCRITICAL FLUID AND AN ORGANIC LIGAND

CROSS-REFERENCE TO RELATED APPLICATIONS

This application is a U.S. national phase under the provisions of 35 U.S.C. § 371 of International Patent Application No. PCT/EP15/70061 filed Sep. 2, 2015, which in turn claims priority of French Patent Application No. 1458226 filed Sep. 3, 2014. The disclosures of such international patent application and French priority patent application are hereby incorporated herein by reference in their respective entireties, for all purposes.

TECHNICAL FIELD

The invention relates to a method of selective extraction of a metal of the family of platinoids from a support containing same, which uses an extraction medium consisting of a supercritical fluid and an organic ligand.

The technical field of the invention may be defined, generally speaking, as that of the treatment of supports and/or substrates notably made of ceramic containing metals of the family of platinoids in order to separate and recover these metals as well as these supports.

PRIOR ART

Heterogeneous catalysis is commonly used in numerous industrial sectors.

It is for example essential in the petrochemicals field or the preparation of synthetic polymers, and it is also implemented in the oil industry and in the automobile industry, notably for the treatment of exhaust gases.

In the majority of cases, the catalysts used consist of an active phase dispersed in a homogenous manner on a porous support.

Favoured supports are generally mineral oxides, such as cerium oxide, and the active phase most of the time consists of metals of the family of platinoids such as platinum, palladium, or rhodium.

Indeed, the particular electronic properties of platinoids make them the most interesting catalysts, notably for New Energy Technologies (NET) such as the catalytic reforming of methane, or the electro-thermo-chemical conversion of water into hydrogen.

Yet, on the one hand, the worldwide production of platinoids is very restricted and very concentrated. Thus, in 2012, for example, Russia and South Africa just between them had a total of nearly 78% of the worldwide production of palladium and 86% of the worldwide production of platinum.

On the other hand, the worldwide consumption of platinoids is important. Indeed, heterogeneous catalysts used for example in the automobile sector may contain high amounts of platinoids. Thus, catalytic converters may contain up to several grams of Pt and one gram of Rh.

This thus presents both a risk of platinoids running out and a situation of dependency of European industries vis-à-vis platinoid producing countries.

This situation of dependency poses a significant risk to these industries and may in the long run threaten the large scale development of certain essential technologies.

The recycling of platinoids from heterogeneous catalysts is thus of crucial interest.

At present, most of the methods aimed at recycling of platinoids that are found on ceramic supports are either pyrometallurgical methods, or methods that comprise a step of chemical attack using a wet process, generally with an acid, then a step of extraction.

In these two methods, the ceramic supports on which the platinoids are present are destroyed. These recycling methods thus only enable the recovery of platinoids and generate wastes that need to be treated.

It is very inconvenient that the ceramic of the supports cannot be recovered like the platinoids, because it may have considerable value. This is for example the case of membrane-electrode assemblies of low temperature fuel cells (PEMFC).

This is the reason why methods for treating materials containing platinoids have been proposed that make it possible to recover the platinoids while preserving the ceramic supports with a view to their reuse.

Thus, it has notably been proposed to carry out the extraction of metals of the family of platinoids contained in catalytic supports by a method using supercritical $CO_2$ ($SC$—$CO_2$) with added ligands, in order to enable both the recovery of the metal and the preservation of the catalytic support.

Thus, several ligands associated with supercritical $CO_2$ have been tested out in the literature.

The document of S. Iwao, S. A. El-Fatah, K. Furukawa, T. Seki, M. Sasaki, M. Goto, "*Recovery of palladium from spent catalyst with supercritical $CO_2$ and chelating agent*", J. of Supercritical Fluids, 2007, 42, p. 200-204 [1], describes the recovery of palladium from spent catalysts with supercritical $CO_2$ and a chelating agent selected from acetyl acetone (AA), a complex of tri-n-butyl phosphate and nitric acid, and bis (2,2,4-trimethylpentlyl)monothiophosphinic acid (Cyanex® 302).

The document of O. Aschenbrenner, S. Kemper, E. Dinjus, N. Dahmen, K. Schaber, "*Solubility of β-diketonates, cyclopentadienyls, and cyclooctadiene complexes with various metals in supercritical carbon dioxide*", J. of Supercritical Fluids, 2007, 41, p. 179-186 [2], studies the solubility of complexes of various metals with β-diketonates, cyclopentedienyls, and cyclooctadienes ligands in supercritical $CO_2$.

The document of Y. Yamini, A. Saleh, M. Khajeh, "*Orthogonal array design for the optimization of supercritical carbon dioxide extraction of platinum (IV) and rhenium (VII) from a solid matrix using Cyanex 301*", Separation and Purification Technologies. 2008, 61, p. 109-114 [3], concerns the optimisation of the extraction of platinum (IV) and rhenium (VII) from a solid matrix using supercritical $CO_2$ containing Cyanex® 301 as chelating agent.

Among compounds used as ligands in supercritical $CO_2$ in platinoid extraction methods, the following may notably be cited:

dithiocarbamates, which have quite a limited efficiency due to their low solubility in SC—$CO_2$.

β-diketones, which are also not very soluble and thus have to be fluorinated to enhance their solubility in supercritical $CO_2$ and to be used in these extraction methods. In addition, in the presence of humidity, the efficiency of β-diketones is very low.

macrocyclic compounds, such as crown ethers or calixarenes.

these compounds are expensive and are not widely available commercially. In addition, these compounds also have to be, in certain cases, fluorinated in order to improve the solubility thereof in supercritical $CO_2$. Organophosphorous compounds, such as CYANEX® type compounds, are for their part commercially available but their extraction efficiency is low.

All the ligands mentioned above are ion exchangers, which thus extract the metal in ionic form.

In order to be able to recover the metals in metal form and recycle them, it is thus necessary at the end of the metal extraction step to carry out a step of purification, and a step of reduction of the metals extracted in ionic form.

These steps of purification and reduction are long and costly.

In addition, as has already been mentioned above, some of the ligands cited above are very little soluble in $SC-CO_2$, and they thus have to be fluorinated, which makes their preparation complex and costly.

There thus exists a need for a method making it possible to extract and to recover selectively the platinoids contained in a ceramic support, notably dispersed on a surface of a ceramic support, which does not lead to either the destruction of the support like pyrometallurgical methods, or methods that comprise a step of chemical attack, or damage to the support.

There exists notably a need for a method making it possible to extract and to recover selectively the platinoids contained in ceramic supports which, while having the advantages of known methods of extraction of platinoids using an extraction medium comprising a supercritical fluid and a ligand, in terms of absence of destruction and of damage of the support, does not however have the drawbacks described above, linked notably to the obligatory presence of steps of purification and reduction of the metals extracted in ionic form and to the fluorination of ligands.

There exists, further, a need for such a method which has a high and improved extraction efficiency, compared to known methods using for example ligands such as Cyanex® ligands, and excellent selectivity.

The goal of the invention is to provide a method of selective extraction of a metal of the family of platinoids from a support containing same, using an extraction medium comprising a supercritical fluid and a ligand, which meets these needs.

The goal of the invention is also to provide such a method which does not have the drawbacks, defects, limitations and disadvantages of methods of the prior art and which brings a solution to the problems posed by methods of the prior art.

DESCRIPTION OF THE INVENTION

This goal, and yet others, are attained in accordance with the invention by a method of selective extraction of a metal of the family of platinoids, from a ceramic support containing said metal, comprising the following successive steps:

a) said ceramic support containing said metal is brought into contact, in an extraction chamber (or reactor), with an extraction medium consisting of a pressurized dense fluid containing an organic ligand that is selective for the metal and that is capable of forming a complex with said metal in the 0 state; whereby are obtained, on the one hand, a ceramic support depleted in said metal, or even free of said metal, and, on the other hand, a medium consisting of the pressurized dense fluid containing the complex of the organic ligand with the metal in the 0 state;

b) said pressurized dense fluid containing the complex of the organic ligand with the metal in the 0 state is brought back to atmospheric pressure and to ambient temperature, whereby the complex of the organic ligand with the metal in the 0 state separates from the fluid;

c) the ceramic support depleted in said metal, or even free of said metal, and the complex of the organic ligand with the metal in the 0 state, are recovered.

The extraction medium used during step a) consists of a pressurized dense fluid, notably supercritical, containing an organic ligand. This means that the extraction medium consists of a pressurized dense fluid, notably supercritical, and of an organic ligand, and does not contain other compounds. In particular, the extraction medium does not contain water, or aqueous solution, notably acid solution. There is thus no emulsion or micro-emulsion in the extraction medium.

The extraction medium is homogenous and monophasic. The ligand is in fact directly solubilised in the pressurized dense fluid, notably supercritical, thus forming an extraction medium which is homogenous, which may be described as a solution of the ligand in the pressurized dense fluid, and which is not in the form of an emulsion or a micro-emulsion.

After bringing into contact, a ceramic support depleted in said metal, or even free of said metal, is obtained, on the one hand, and, on the other hand, a medium consisting of the pressurized dense fluid, notably supercritical, containing the complex of the organic ligand with the metal in the (0) state is obtained.

This medium obtained at the end of step a) consists of the pressurized dense fluid, notably supercritical, containing the complex of the organic ligand with the metal in the (0) state.

This means that this extraction medium consists of the pressurized dense fluid, notably supercritical, and of the complex of the organic ligand with the metal in the (0) state, and does not contain other compounds. In particular, the extraction medium does not contain water, or aqueous solution, notably acid solution. There is thus no emulsion or micro-emulsion in the extraction medium.

This medium is homogenous and monophasic. The complex of the ligand with the metal is in fact directly solubilised in the pressurized dense fluid, notably supercritical, thus forming a medium that is homogenous, which can be described as a solution of the complex in the pressurized dense fluid, and which is not in the form of an emulsion or a micro-emulsion.

The method according to the invention comprises a specific sequence of specific steps which is neither described, nor suggested in the prior art, as represented in particular by the documents cited above.

The method according to the invention is fundamentally distinguished from methods of the prior art in that it uses a specific organic ligand which is a ligand that is selective for the metal and which is capable of forming a complex with said metal in the 0 oxidation state, in the metal state, in the elementary metal state.

The ligand used in the method according to the invention is a ligand suited to the very particular electron structure of platinoids. The ligand used in the method according to the invention may be described as a "soft ligand", forming a ligand/metal (0) complex, that is to say that it has metal (0) complexing properties.

An example of such a "soft" ligand is dodecanethiol, which is known to have such metal (0) complexing properties, as is described in the documents of L. Lingxingyu, K. Leopold, J. Anal. Chem. 84 (2012), 4340-4349; Y. J. Park, J. Hazardous Materials, 164 (2009), 1152-1158 [4].

The use of such a ligand in an extraction method in supercritical medium is neither described nor suggested in the prior art.

In other words, in the method according to the invention, a ligand enabling the direct extraction of the metal in the 0 state, in the metal state, namely in the elementary metal state, is used whereas in methods of the prior art the ligands used are always ion exchangers that impose that the extracted metal is in ionic form with all the drawbacks that result therefrom.

The method according to the invention is also distinguished from methods of the prior art, as already described above, in that the extraction medium and the medium obtained at the end of step a) are homogenous and monophasic and do not contain water or an aqueous solution, notably an acid solution. These media are in the form of solutions of the specific ligand or of the complex in the pressurized dense fluid, and not in the form of emulsions or micro-emulsions.

The method according to the invention meets the needs enumerated above.

The method according to the invention of selective extraction of a metal of the family of platinoids from a support containing same, which uses an extraction medium comprising a supercritical fluid and a ligand, does not have the drawbacks of the methods of the prior art described above, notably due to the fact of the use of an organic ligand that is selective for the metal and that is capable of forming a complex with said metal in the 0 state, which enables extraction of the metal directly in metal form, and not in ionic form; for example, in the method according to the invention, the metal particles contained in a support, notably dispersed on an external surface of a support, are directly extracted then recovered in this form of metal particles.

Hence, the method according to the invention does not require a step of purification or a step of reduction of the extracted metals since they are extracted directly in metal form. The number of steps and the duration and the cost of the method according to the invention are thus reduced.

In the method according to the invention the support is preserved, it is not destroyed, for example by an acid attack, or even damaged, and it may be recovered and reused.

The ligands used in the method according to the invention are easily available commercially, are soluble in pressurised dense fluids such as supercritical $CO_2$, and do not require fluorination treatment to improve the solubility thereof.

The method according to the invention makes it possible to obtain enhanced extraction efficiency compared to methods implementing ligands such as Cyanex® (see the examples provided below).

The specific ligands used in the method according to the invention have better selectivity vis-à-vis platinoids than the ligands used until now, such as Cyanex® ligands (see the examples provided below).

The ceramic of the support may notably be selected from metal oxides such as alumina, and cerium oxide; metal carbides such as silicon carbide; metal silicates such as cordierite; and mixtures thereof.

The ceramic support is generally a porous support.

Porous support is generally taken to mean that this support has a porosity of 10 to 90% by volume, notably from 25 to 75% by volume.

No limitation exists as regards the size and the shape of the support that may be treated by the method according to the invention. This support may be for example in the form of solid parts of large size or in the form of discrete particles such as beads, or grains, granules of a size for example from 100 nm to 10 mm.

A single support or several supports may be treated by the method according to the invention.

The support containing a metal of the family of platinoids may notably be a spent catalyst. This spent catalyst may be a catalyst used in automobiles, for example a catalyst used to treat exhaust gases, in the chemical industry or the oil industry.

Advantageously, the metal of the family of platinoids is selected from platinum, palladium, rhodium, ruthenium, gold, silver, and alloys and mixtures thereof.

Advantageously, the metal is in the form of nanoparticles dispersed on at least one external surface of the ceramic support and the metal is extracted in the form of nanoparticles of metal in the (0) metal state.

Nanoparticles is taken to mean particles of which the size, defined by the greatest dimension, is from 1 to 500 nm, preferably from 1 to 100 nm, still preferably from 1 to 10 nm, for example 3 nm.

Advantageously, the fluid is selected from carbon dioxide; helium; xenon; nitrogen; nitrous oxide; sulphur hexafluoride; gaseous alkanes of 1 to 5 atoms of carbon such as methane, ethane, propanes, n-butane, isobutane, and neopentane; gaseous fluorinated hydrocarbons; gaseous chlorinated and/or fluorinated hydrocarbons, for example, hydrochlorofluorocarbons, known as HCFCs, or substitutes thereof, within the framework of current legislation; ammonia; and mixtures thereof.

Any compound able to have a dense and pressurised, in particular supercritical, state may obviously be used, and the use of which remains compatible with the material or materials constituting the support to be treated.

Carbon dioxide is preferred because it has the advantage of relatively easy implementation: it is cheap, non-toxic, non-flammable and has easily accessible critical conditions (critical pressure: Pc of 7.3 MPa and critical temperature Tc of 31.1° C.).

Advantageously, the pressurized dense fluid is in the liquid state, dense gas state, or in the supercritical state.

Advantageously, the pressurized dense fluid, such as $CO_2$, is at a pressure of 50 to 700 bars, and at a temperature of 15° C. to 200° C., for example at a pressure of 250 bars and at a temperature of 60° C. to 110° C.

Advantageously, the pressurized dense fluid may contain a co-solvent such as water or an organic solvent.

Advantageously, the organic ligand that is selective for the metal is selected from thiols of formula RSH, in which R represents a linear or branched alkyl group of 1 to 20 C; preferably 1 to 12 C, still preferably 1 to 10 C, for example the organic ligand that is selective for the metal is dodecanethiol. These ligands of formula RSH consist of a simple carbon chain (without atoms other than C and H, such as Si or F) and a chelating function, which is a simple SH group.

These ligands are easily available commercially and are of simple structure and do not have to be specially prepared by a long and complex method.

Advantageously, the organic ligand that is selective for the metal represents from 1 to 20% by weight of the extraction medium.

Advantageously, simultaneously to being brought into contact, the support and/or the extraction medium are subjected to mechanical action.

Advantageously, the mechanical action is selected from one or more among an agitation, a turbulence, a shear, an electromechanical action and an ultrasonic action.

The method according to the invention may further comprise, at the end of step c), a step d) during which the metal is recovered from the complex, for example by thermal treatment of the complex.

Or instead the complex may be used directly. For example, the complex may be deposited on a new support.

The deposition on the new support may notably be carried out by a method of deposition in supercritical medium.

In a first embodiment of the method according to the invention, it may be carried out in static mode, and it further comprises, prior to step a), a step a1):

a1) the ceramic support containing the metal and the organic ligand that is selective for the metal 0 are placed in the extraction chamber, then the fluid is introduced into the extraction chamber, and a temperature and a pressure are established in the extraction chamber such that the fluid is dense and pressurised;

and in this first embodiment of the method according to the invention, during step b), the pressure in the extraction chamber is brought back to atmospheric pressure, the temperature is brought back to ambient temperature, the fluid is evacuated from the extraction chamber in the form of a stream of gas, the complex is carried away (swept along) with the stream of gas, and optionally the complex is recovered in a separator placed at the outlet of the extraction chamber.

Advantageously, during step a) of this first embodiment of the method according to the invention, the ceramic support containing the metal is brought into contact with the extraction medium for a duration of 1 to 24 hours.

Advantageously, in this first embodiment of the method according to the invention, the proportion by weight of the ceramic support containing the metal compared to the volume of selective organic ligand is from 0.01 g/mL to 0.5 g/mL, for example 0.25 g/mL.

Advantageously, in this first embodiment of the method, during step a1), the ceramic support containing said metal and the selective organic ligand are placed in the extraction chamber in such a way that the ceramic support containing the metal and the selective organic ligand are in direct contact or instead, in this first embodiment of the method, during step a1), the ceramic support containing said metal and the selective organic ligand are placed in the chamber in such a way that the ceramic support containing the metal and the selective organic ligand are not in direct contact (see for example FIG. 8).

In a second embodiment of the method according to the invention, it may be carried out in dynamic mode, and it further comprises, prior to step a), steps a2), a3) and a4):

a2) the selective organic ligand is placed in a solubilisation chamber in fluidic communication with the extraction chamber, and the ceramic support containing the metal is placed in the extraction chamber; then a3) a stream of pressurized dense fluid is sent continuously into the solubilisation chamber, whereby is obtained the extraction medium consisting of the pressurized dense fluid containing a selective organic ligand;

a4) a stream of the extraction medium is sent continuously into the extraction chamber;

and in this second embodiment of the method according to the invention, at the end of step a), a stream of the pressurized dense fluid containing the complex of the organic ligand with the metal in the 0 state is drawn off from the extraction chamber and sent into a reservoir where steps b) then c) are carried out.

Advantageously, in this second embodiment of the method according to the invention, during step b) the pressure in the reservoir is brought back to atmospheric pressure, the temperature is brought back to ambient temperature and the fluid is evacuated from the reservoir in the form of gas while the complex of the organic ligand with the metal in the 0 state remains in the reservoir.

The invention will be better understood on reading the detailed description that follows of particular embodiments of the invention, notably in the form of examples, this description being made in relation with the appended drawings.

The tests are carried out by bringing into contact, in a beaker, for 5 hours, 0.25 g of catalyst supported on alumina (0.25 g represents the total mass of alumina and metal) and 5 mL of ligand at the desired temperature.

Curve A is the curve for the solution obtained at a contact temperature of 150° C.

Curve B is the curve for the solution obtained at a contact temperature of 110° C.

Curve C is the curve for the solution obtained at a contact temperature of 80° C.

Curve D is the curve for the solution obtained at a contact temperature of 60° C.

Curve E is the curve for the solution obtained at a contact temperature of 25° C.

Figure 6:
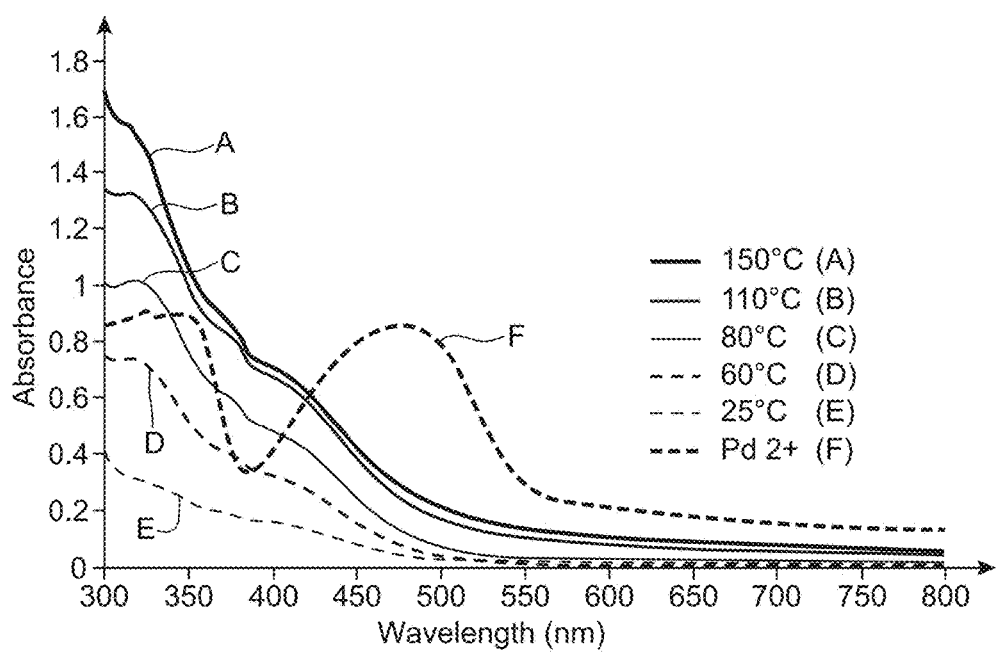
FIG. 6 is a graph that gives the absorbance as a function of wavelength (in nm) of the solutions in dodecanethiol obtained during palladium extraction tests carried out at different contact temperatures (FIG. 5).

FIG. 6 also shows curve F, which is the curve obtained for a solution of palladium of degree of oxidation II.

Figure 7:
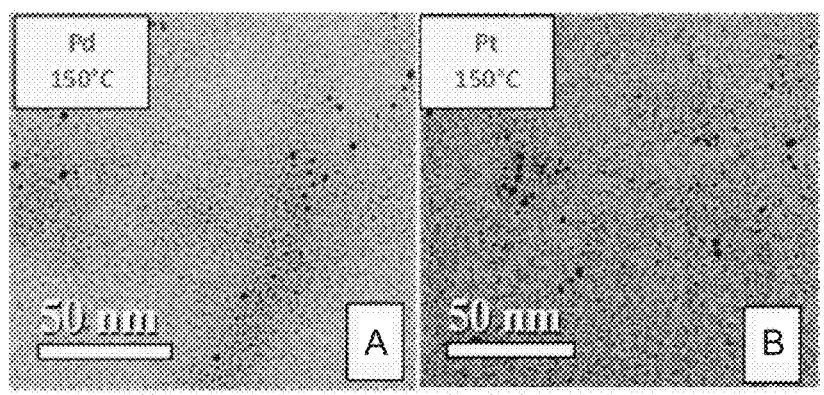

FIGS. 7A and 7B show transmission electron microscopy (TEM) images of nanoparticles of palladium (A) and nanoparticles of platinum (B) in dodecanethiol obtained by bringing into contact 0.25 g of catalyst and 5 mL of ligand at 150° C. for 5 hours.

The scale given in FIGS. 7A and 7B represents 50 nm.

Figure 8:
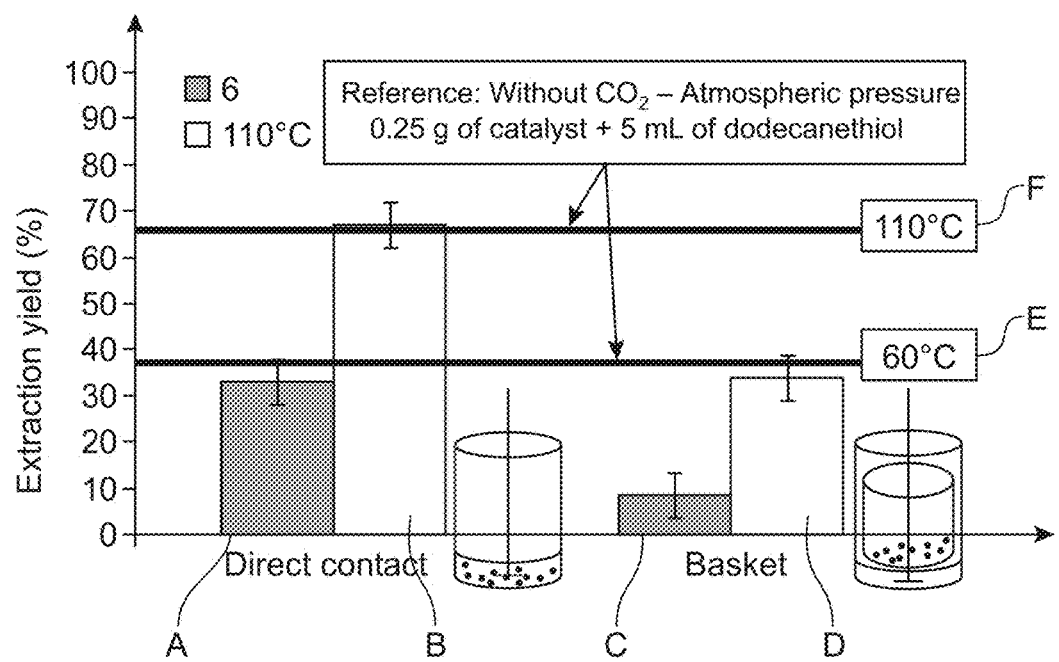

FIG. 8 is a graph that gives the extraction yield (in %) after 5 hours of being in contact during palladium extraction tests carried out in static mode in supercritical $CO_2$ medium comprising the dodecanethiol ligand at 250 bars.

The tests were carried out with 0.25 g of catalyst supported on alumina (0.25 g represents the total mass of alumina and metal) and 5 mL of ligand. The tests were carried out either with direct contact of the ligand and the supported catalyst (bars A and B) at 60° C. (bar A grey) and 110° C. (bar B white); or without direct contact of the ligand and the supported catalyst, this being placed in a basket (bars C and D) at 60° C. (bar C grey) and 110° C. (bar D white). As a reference, FIG. 8 also shows the extraction yields obtained during tests obtained by bringing into contact 0.25 g of supported catalyst and 5 mL of dodecanethiol, without $CO_2$, at atmospheric pressure, for 5 hours respectively at 60° C. (curve E) and at 110° C. (curve F).

Figure 9:
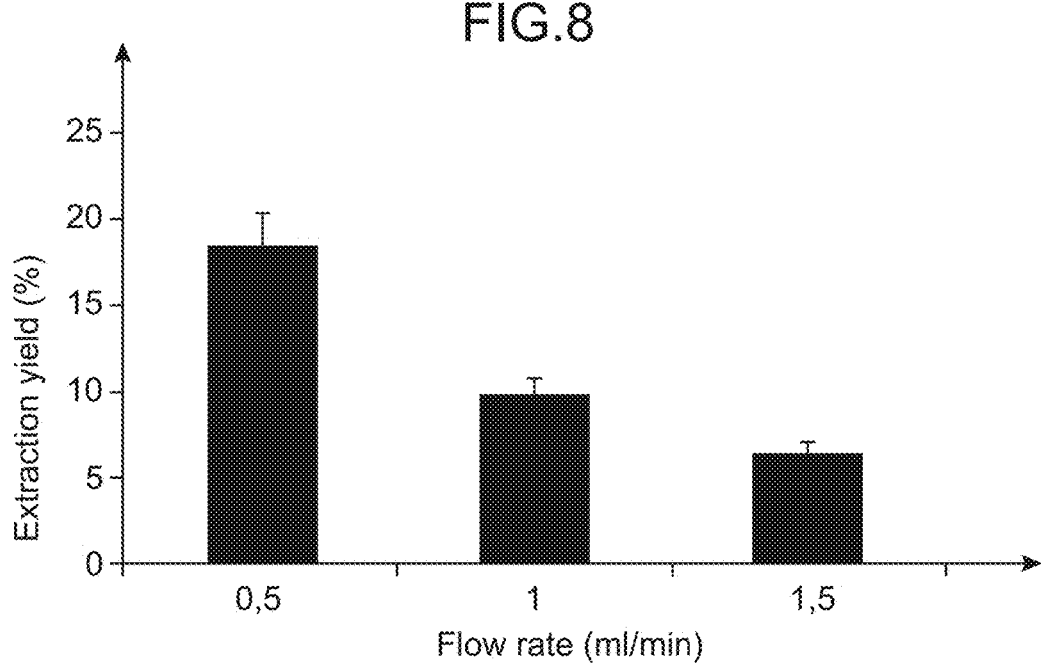

FIG. 9 is a graph that gives the extraction yield (in %) as a function of the flow rate of $CO_2$ (in mL/min) during tests of extraction of palladium by dodecanethiol in supercritical medium carried out in dynamic mode for 3 hours at 250 bars and 60° C.

The tests were carried out with 0.25 g of catalyst supported on alumina and at three different flow rates, namely from left to right: 0.5; 1; and 1.5 mL/min.

Figure 10:
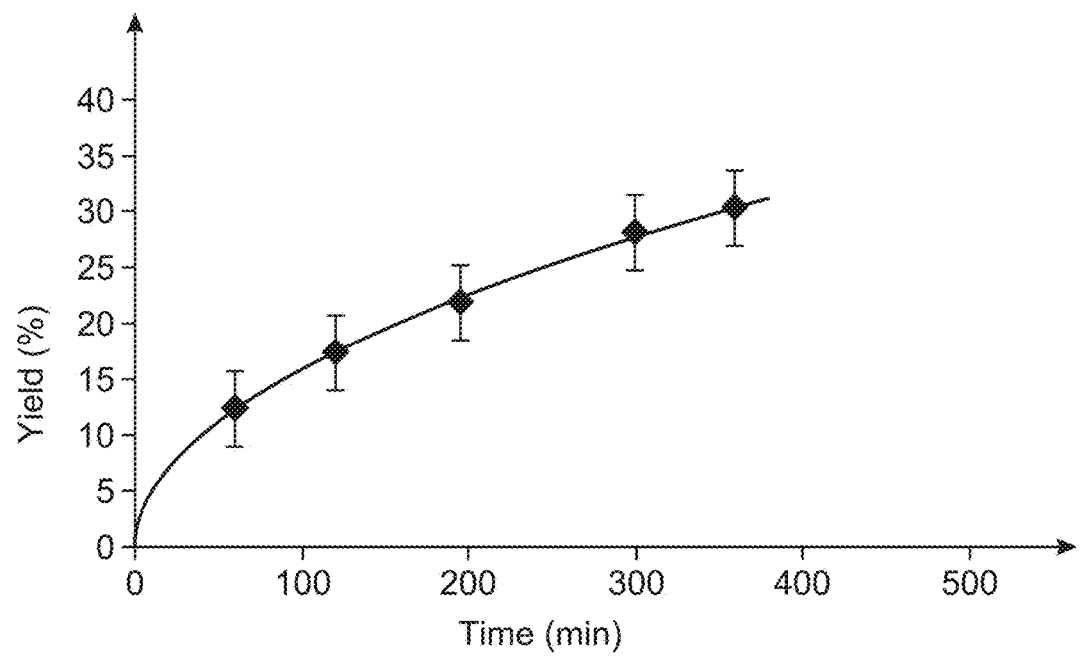

FIG. 10 is a graph that gives the extraction yield (in %) as a function of the duration of the extraction (in minutes) during tests of extraction of palladium by dodecanethiol in supercritical $CO_2$ medium carried out in dynamic mode at 250 bars, 60° C., and at a flow rate of $CO_2$ of 0.5 m L/min.

The tests were carried out with 0.25 g of catalyst supported on alumina (0.25 g represents the total mass of alumina and metal).

Figure 11:
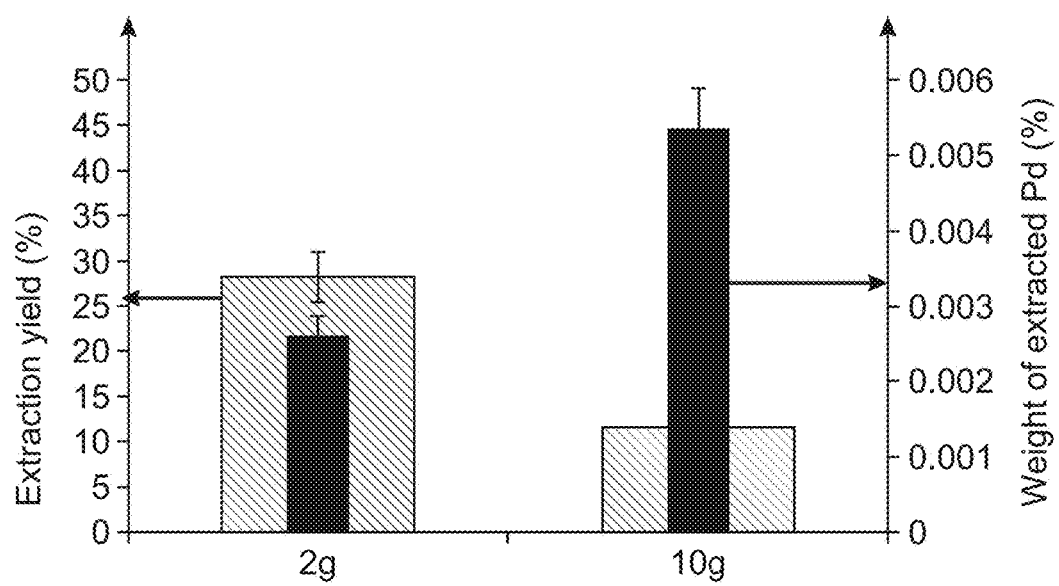

FIG. 11 is a graph that gives the extraction yield (in % on the left) and the weight of palladium extracted (in g, on the right) as a function of the quantity of catalyst (in g), during tests of extraction of palladium by dodecanethiol in supercritical $CO_2$ medium carried out in dynamic mode for 5 hours at 250 bars, 60° C., and with a flow rate of $CO_2$ of 0.5 mL/min.

The tests were carried out either with 2 g (bars on left), or with 10 g (bar on right) of catalyst supported on alumina (2 g or 10 g represent the total mass of alumina and metal).

The hatched grey bars represent the extraction yield of Pd and the black bars represent the weight of Pd extracted.

DETAILED DESCRIPTION OF PARTICULAR EMBODIMENTS

Particular embodiments of the method of the invention are described hereafter, namely a first embodiment of the method according to the invention wherein it is carried out in so-called "static" mode and a second embodiment of the method according to the invention, wherein it is carried out in so-called "dynamic" mode.

This description of particular embodiments of the method of the invention is rather made in relation with installations used for the implementation of the method but the teachings that are provided therein obviously apply to the methods as such.

Figure 1:
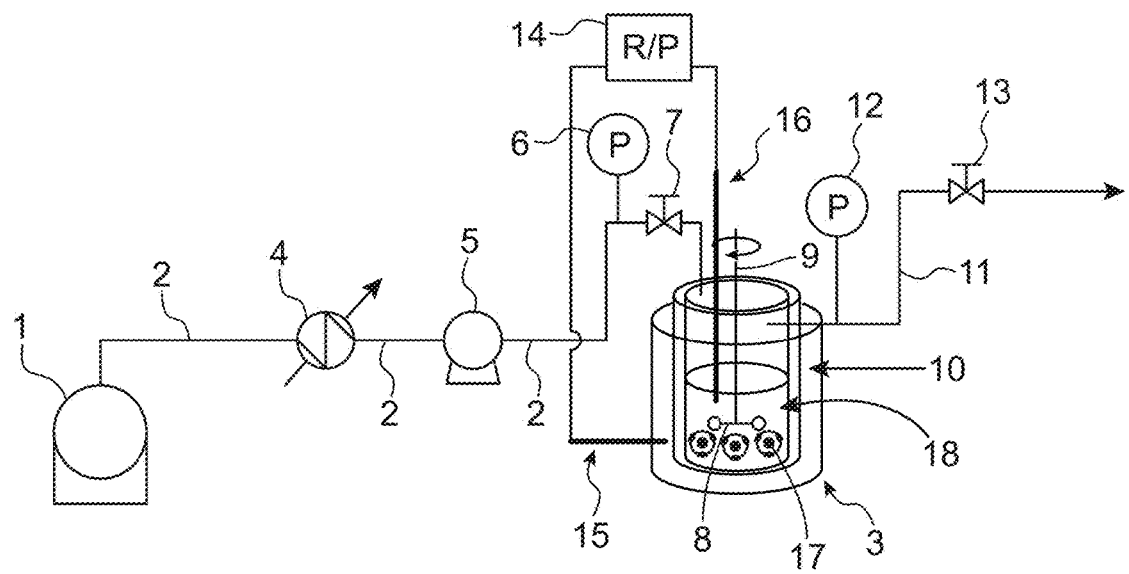
FIG. 1 is a schematic view of an installation for the implementation of the method according to the invention according to a first embodiment thereof, carried out in static mode.

An installation for the implementation of the method according to the invention according to a first embodiment thereof, in static mode, is described in FIG. 1.

This installation comprises a reservoir of fluid (1), for example liquid $CO_2$. This reservoir (1) is connected to a pipe (2), which makes it possible to convey the fluid to the extraction chamber or reactor (3) going successively through a cold exchanger (4) and a high pressure pump (5). The high pressure pump (5) makes it possible to reach the desired fluid pressure, for example up to 300 bars.

The pipe (2) may also comprise a manometer (6) and a valve (7), after the pump (5) and before the chamber or reactor (3).

The reactor (3) may have the shape of a straight vertical cylinder and its volume is such that it makes it possible to receive supports capable of being treated by the method according to the invention.

The material of the reactor (3) is chosen in such a way as to be compatible with the pressurized dense fluid and the thickness of the walls of the reactor is chosen to withstand the pressure that reigns inside the reactor.

The reactor may be a stirred reactor. Thus, the reactor (3) represented in FIG. 1, includes a stirrer (8) fixed to the lower end of a rotating stirring rod (9).

The reactor (3) is provided with heating means, for example of a ceramic heater band (10).

The installation further comprises an evacuation pipe or vent line (11), which makes it possible to evacuate the fluid from the reactor in the form of a gas and thus to bring back the pressure inside the chamber to atmospheric pressure. In other words, the depressurisation of the reactor takes place through the vent line (11).

The pipe (11) may also comprise a manometer (12) and a valve (13).

The installation may further comprise a temperature regulator/programmer (14) connected to a thermocouple (15) placed in the heating means and to a thermocouple (16) placed in the reactor in contact with the fluid. More exactly, the thermocouple is placed in a sleeve that is immersed in the fluid.

The support containing a metal of the family of platinoids (for example a supported catalyst) and the extractant, ligand are firstly introduced into the reactor.

In FIG. 1, the embodiment is represented where the support containing a metal of the family of platinoids (for example a supported catalyst) and the extractant, ligand are in direct contact. In FIG. 1, the support, for example in the form of beads (17), is immersed in the liquid ligand (18) placed at the bottom of the reactor.

If it is wished to avoid direct contact between the support containing the metal and the ligand, then means will be provided in the reactor to receive the support and to maintain it at a distance from the ligand.

The ligand being generally placed in the lower part of the reactor, at the bottom of the reactor, the means for receiving the support and maintaining it at a distance from the ligand may consist of a receptacle such as a basket placed in the reactor at a height such that the support is maintained above the upper level of the ligand at the bottom of the reactor.

Figure 2:
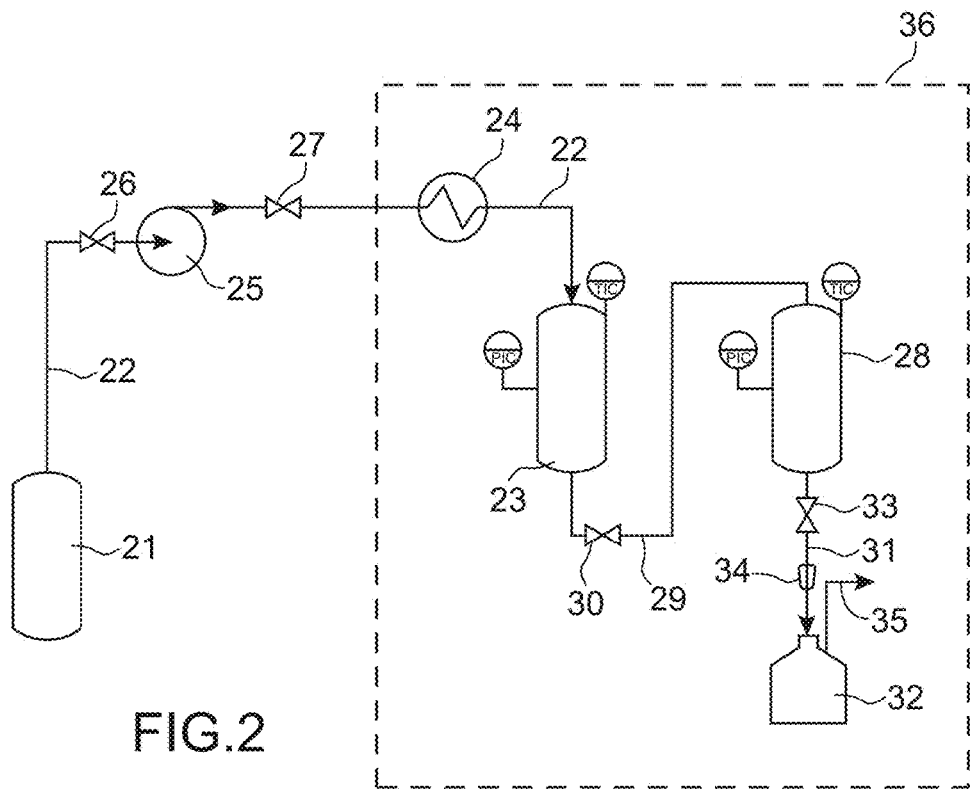
FIG. 2 is a schematic view of an installation for the implementation of the method according to the invention according to a second embodiment thereof, carried out in dynamic mode.

An installation for the implementation of the method according to the invention according to a second embodiment thereof, in dynamic mode, is described in FIG. 2.

This installation comprises a reservoir of fluid (21), for example a cylinder of liquid $CO_2$. This reservoir (21) is connected to a pipe (22), which makes it possible to convey the fluid up to a first reactor (23) going through a cold exchanger (24) and a high pressure pump (25). The high pressure pump (25) makes it possible to reach the desired fluid pressure, for example up to 300 bars.

The pipe (22) generally comprises a first valve (26) upstream of the pump (25), and a second valve (27) between the pump (25) and the exchanger (24).

The pipe (22) arrives generally at the top of the first reactor (23).

The first reactor (23) is called solubilisation reactor or chamber.

In fact, in this reactor the ligand is solubilised in the pressurized dense fluid.

The first reactor (23) is connected to a second reactor (28) by a pipe (29), generally provided with a valve (30).

This pipe (29) generally connects the bottom of the first reactor (23) to the top of the second reactor (28). But the pipe (29) could conversely connect the top of the first reactor (23) to the bottom of the second reactor (28) or connect the two flanges of each reactor (23), (28).

The second reactor (28) is called extraction reactor or chamber.

In fact, in this second reactor (28) is placed the support containing a metal of the family of platinoids and the extraction of the metal contained in the support is carried out by the extraction medium comprising the pressurized dense fluid, notably supercritical, and the ligand.

The second reactor (28) is connected via a pipe (31) to a vessel, reservoir, designated collection vessel (32).

Indeed, this vessel (32) is intended to collect the pressurized dense fluid loaded with the complex of the ligand and the metal in the (0) oxidation state coming from the extraction operation carried out in the second reactor.

The pipe (31) generally comprises, from the second reactor (28), an outlet valve (33) then an overflow valve (34).

The pipe (31) generally connects the bottom of the second reactor (28) to the top of the collection vessel (32). But the pipe (31) could conversely connect the top of the second reactor (28) to the bottom of the collection vessel (32), or connect the flange of the second reactor (28) and the flange of the collection vessel (32).

The installation further comprises an evacuation pipe or vent line (35), which makes it possible to evacuate the fluid from the collection vessel in the form of a gas and thus to bring back the pressure inside the collection vessel to atmospheric pressure. In other words, the depressurisation of the collection vessel takes place through the vent line (35).

In fact, the depressurisation generally begins from the valve (33).

There is generally practically no more pressure in the collection vessel (32). The fluid, such as $CO_2$, is then in gaseous form and goes to the vent (35) whereas the ligand/complex mixture is recovered in the form of a liquid, or in the form of a suspension of metal particles in the ligand.

The exchanger (24), the reactors (23) and (28) and the collection vessel (32) are generally placed in a temperature regulated chamber (36) such as an oven.

The invention will now be described with reference to the following examples, given by way of illustration and non-limiting.

EXAMPLES

Example 1

In this example, the capacity of different ligands, extracting molecules, complexing agents, to extract selectively platinum or palladium from catalytic supports on which they are supported is studied.

To this end, tests were carried out in a beaker on commercially available supported catalysts of palladium on alumina and platinum on alumina type with different ligands, extracting, complexing molecules, or extractants.

Tests were thus carried out with dodecanethiol ($CH_3(CH_2)_{10}CH_2$—SH) as extracting molecule. Dodecanethiol is in fact capable of playing the role of soft ligand to complex platinoid type metals in metal (0) form.

Other comparative tests were carried out with Cyanex® 272 and Cyanex® 302 as extracting molecules.

Cyanex® 272 is an oxygenated ligand of phosphonate type, whereas Cyanex® 302 is a ligand of thiophosphonate type.

Cyanex® 272 and Cyanex® 302 meet the formulas below:

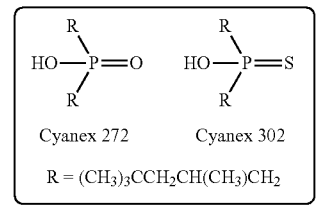

The efficiency of extraction of palladium and platinum is determined by direct contact of the extractant—generally a volume of extractant of 5 mL or 20 mL is used—with the supported catalyst—generally a weight of catalyst of 0.25 g or 1 g (0.25 g or 1 g represent the total mass of alumina and metal) is used at atmospheric pressure.

After the extractant and the supported catalyst have been brought into contact, the solid phase, which essentially consists of the residual supported catalyst, is separated from the liquid organic phase consisting of the extractant and of the complexed metal.

The solid phase is then dried and calcinated at 200° C. to remove any trace of extractant remaining in the porosity of the support.

The quantity of metal remaining in the solid is then determined by ICP-AES (Inductively Coupled Plasma Atomic Emission Spectroscopy) carried out using an iCAP® 6300 Duo apparatus from Thermo Scientific®.

This analysis is carried out after grinding and digestion of the catalyst with nitric acid. To do so, 0.20 g of solid are dissolved in 5 mL of 68% $HNO_3$ placed in a Teflon coated autoclave Model 4744 from Parr® at 150° C. for 2 h.

The extraction efficiency is defined by determining the extraction yield R %, which is given by the following formula:

$$R\ \% = \left(1 - \frac{c_f}{c_i}\right) \times 100$$

where $c_i$ is the initial concentration of metal in the catalyst before extraction, and $c_f$ is the final concentration of this same metal in the catalyst after extraction.

Figure 3:
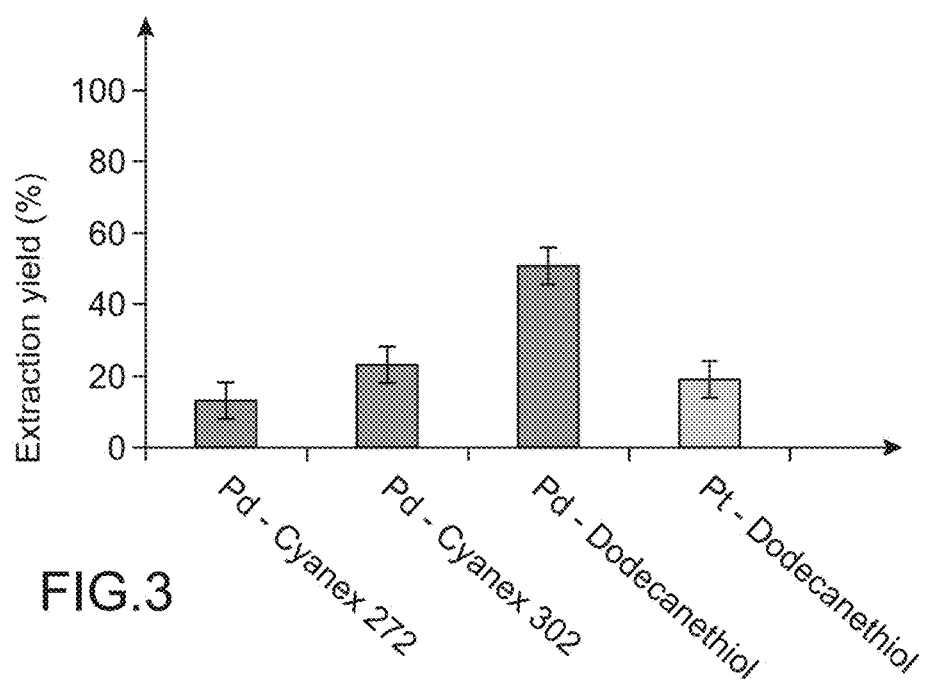
FIG. 3 is a graph that gives the extraction yields of palladium (in %), obtained with the ligands Cyanex® 272, Cyanex® 302, and dodecanethiol and the extraction yield of platinum (in %), obtained with dodecanethiol during extraction tests. The extraction tests were carried out by bringing into contact, in a beaker, 1 g of catalyst supported on alumina (1 g represents the total mass of alumina and metal) and 20 mL of ligand at 60° C. for 72 hours.

FIG. 3 gives the extraction yields obtained during tests of extraction of palladium or platinum supported on alumina, carried out with different ligands, namely dodecanethiol, Cyanex® 272 and Cyanex® 302.

The operating procedure of these tests is that described above: during each of the tests, 20 mL of each ligand is brought into contact, in a beaker, with 1 g of metal catalyst supported on alumina, at 60° C. for 72 h.

The results of these tests, shown in FIG. 3, demonstrate good affinity of dodecanethiol for palladium, compared to that observed for Cyanex® described in the literature.

Indeed, the extraction yield of Pd obtained with dodecanethiol lies around 50% after 72 h of being in contact at 60° C. (FIG. 3).

The extraction of platinum by dodecanethiol—with an extraction yield R % around 20% after 72 h of being in contact at 60° C.—although less good than that observed for palladium, was also demonstrated (FIG. 3).

Example 2

In this example, tests are carried out to study the influence of the parameters of duration of contact between the ligand and the catalyst, and extraction temperature, on the extraction yield of Pd or Pt by dodecanethiol.

The operating procedure of these tests is that described above in the example 1.

To study the effect of the duration of contact between the ligand and the catalyst on the extraction yields of Pd and Pt by dodecanethiol, 0.25 g of catalyst and 5 mL of ligand were brought into contact at 60° C. for durations of 5, 24, 42 and 75 hours for palladium and for durations of 5 hours and 72 hours for platinum.

Figure 4:
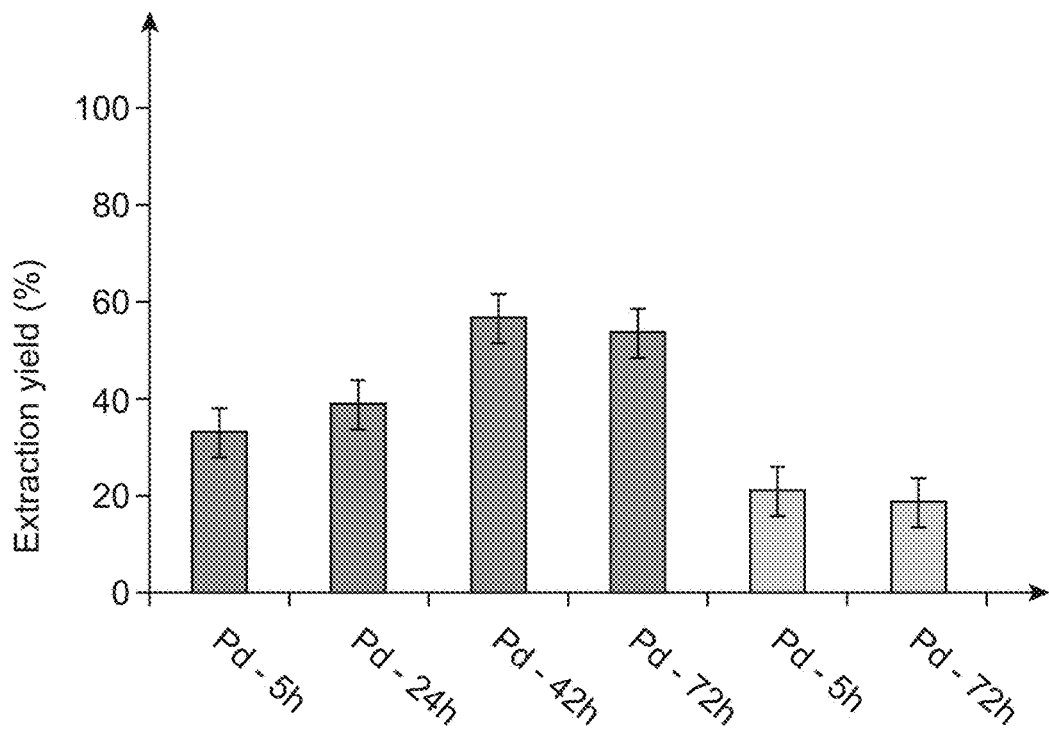
FIG. 4 is a graph that gives the extraction yields of palladium (in %) and platinum (in %), obtained with the dodecanethiol ligand for different contact durations, namely 5, 24, 42, and 72 hours for palladium, and 5 and 72 hours for platinum, during extraction tests. The extraction tests were carried out by bringing into contact, in a beaker, 0.25 g of catalyst supported on alumina (0.25 g represents the total mass of alumina and metal) and 5 mL of ligand at 60° C. for the desired duration.

The results of these tests are given in FIG. 4.

It may be noted that, for palladium, the extraction yield increases with the duration of contact and reaches a maximum for a contact duration of 42 hours.

To study the effect of the extraction temperature on the extraction yields of Pd and Pt by dodecanethiol, 0.25 g of catalyst and 5 mL of ligand were brought into contact for 5 h at temperatures of 25° C., 60° C., 80° C., 110° C. and 150° C. for palladium and at temperatures of 60° C. and 150° C. for platinum.

Figure 5:
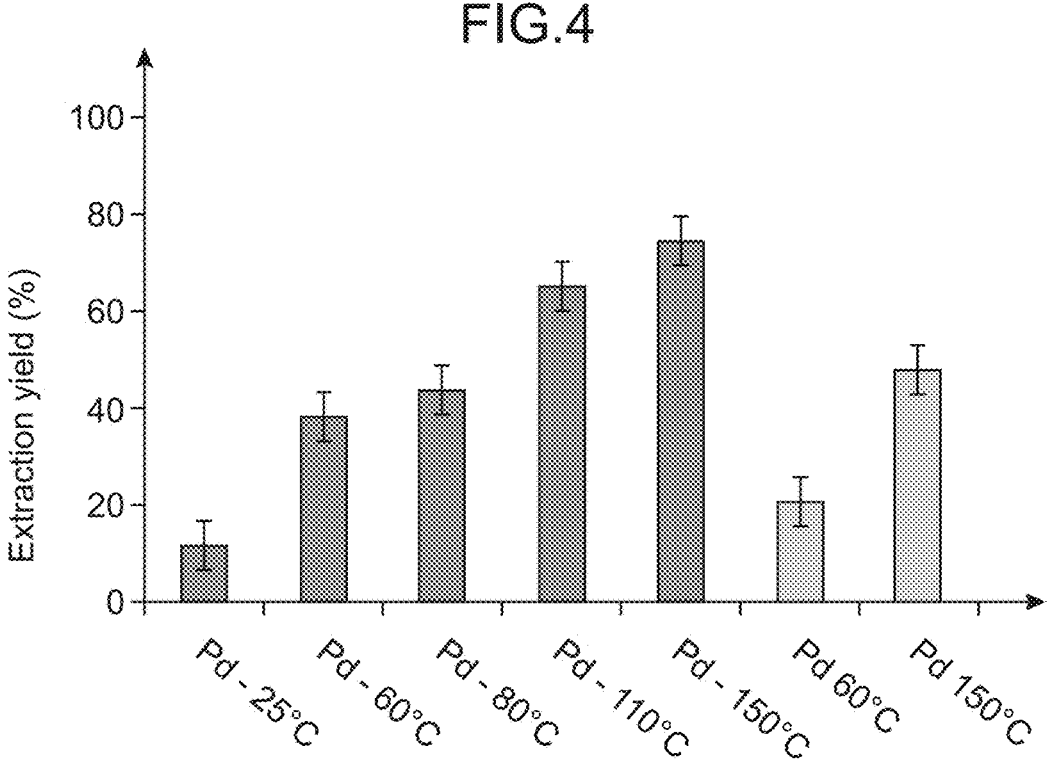
FIG. 5 is a graph that gives the extraction yields of palladium (in %) and platinum (in %), obtained with the dodecanethiol ligand for different contact temperatures, namely 25° C., 60° C., 80° C., 110° C., and 150° C. for palladium, and 60° C. and 150° C. for platinum, during extraction tests. The extraction tests were carried out by bringing into contact, in a beaker, for 5 hours, 0.25 g of catalyst supported on alumina (0.25 g represents the total mass of alumina and metal) and 5 mL of ligand at the desired temperature.

The results of these tests are given in FIG. 5.

It may be noted that, both for palladium and for platinum, the extraction yields increase with contact duration. Thus, for palladium, the extraction yield may reach 75% at 150° C. whereas the increase in the extraction yield of platinum by dodecanethiol at high temperature (150° C.) is also demonstrated in FIG. 5.

It may be concluded therefrom that parameters such as the contact time and the extraction temperature seem to greatly influence the extraction of Pd, but also notably as regards the temperature, and more particularly at high temperature (150° C.), that of Pt, by dodecanethiol.

Example 3

In this example, it is shown that the extraction of the metal by the specific ligands used in the method according to the invention takes place in reduced form, that is to say in the form of metal (0) nanoparticles.

The ligands having thiol groups used in the method according to the invention, such as dodecanethiol, are very soft ligands that easily complex nanoparticles of noble metals.

The high selectivity of these ligands vis-à-vis platinoids and notably vis-à-vis palladium compared to harder and more ionic ligands such as oxygenated ligands of phosphonate type such as Cyanex® 272 is a first hint of the extraction of a reduced form of these platinoids. Reference could be made in this respect to example 1 and to FIG. 3.

On the other hand, particles in suspension are clearly visible in the fractions extracted with dodecanethiol at temperatures above 110° C.

Then, FIGS. 7A and 7B, which are respectively images taken by transmission electron microscopy (TEM) of the suspensions of nanoparticles of Pd (FIG. 7A) and Pt (FIG. 7B) in dodecanethiol obtained by bringing into contact 0.25 g of catalyst and 5 mL of ligand at 150° C. for 5 h, indeed confirm the presence in these suspensions of nanoparticles of Pt or Pd of a size of around 3 nm, namely a size of nanoparticles equivalent to the size of the nanoparticles of Pd or Pt measured in the supported catalyst.

For the suspensions obtained by extraction at 60° C., metal nanoparticles were not able to be observed by transmission electron microscopy.

It may be thought that, either the particles are finer, or less concentrated and thus difficult to see, or the metal is solubilised in dodecanethiol as could be shown by the different colour of the solution obtained by extraction at this temperature.

However, the UV/Visible spectra of the solutions/suspensions of Pd (FIG. 6) obtained in dodecanethiol at different temperatures compared to the spectrum of a solution of Pd with a degree of oxidation II seems to demonstrate the presence of Pd metal (0) and especially the absence of Pd II.

Example 4

In this example, extraction tests are carried out in which the ligand, extractant is placed in a supercritical $CO_2$ medium.

In this example, the tests are carried out in static mode, in order to check the feasibility of the extraction in this supercritical medium and to study potential limitations due to the solubility of the ligand in $CO_2$.

The pilot plant used, which is that represented in FIG. 1 already described above, consists of a liquid $CO_2$ reserve, of a high pressure pump making it possible to work up to 300 bars, and of a 0.5 L stainless steel reactor.

The reactor is a reactor stirred by means of a stirrer fixed to the lower end of a rotating stirring rod.

The reactor is heated using a ceramic heating band and may reach a temperature of 350° C. The depressurisation of the reactor takes place via the vent line.

The catalyst and the extractant, ligand are firstly introduced into the reactor.

Two embodiments are, in this respect, possible:
(1) The catalyst and the ligand are both in direct contact at the bottom of the reactor, or instead
(2) The ligand is at the bottom of the reactor, and the catalyst is in a basket fixed to the stirring rod. This embodiment thus avoids direct contact between the ligand and the catalyst and demonstrates the solubilisation of the ligand in supercritical $CO_2$.

The reactor is then closed, then $CO_2$ is added and the temperature adjusted to reach the desired experimental conditions.

In this example, the tests were carried out at 250 bars and two temperatures were studied, 60° C. and 110° C. for each of the embodiments. The operating conditions were maintained for 5 h before depressurising the reactor, recovering the catalyst and analysing the quantity of metal that it contains by digestion in nitric acid medium and ICP-AES analysis as has already been described above in example 1.

The tests carried out according to embodiment (1) by immersing the beads of catalyst in dodecanethiol in the presence of $CO_2$ lead to extraction yields equivalent to those obtained in a beaker in the same operating conditions, namely 0.25 g of catalyst for 5 mL of ligand, for 5 h at the same temperature. These extraction yields R % are in fact around 35% at 60° C. and around 65% at 110° C. The presence of $CO_2$ does not prevent the extraction (FIG. 8, left bars A and B).

The same tests carried out according to embodiment (2), in supercritical $CO_2$ medium, without direct contact of the beads of catalyst with the ligand, also lead to the extraction of the metal particles, thus proving the solubility of dodecanethiol in $CO_2$.

However, the extraction yield is reduced with respect to that obtained when the catalyst and the ligand are in direct contact according to embodiment (1). Indeed, R % then lies at around 10% at 60° C. and around 35% at 110° C. (right bars C and D). This reduction in the extraction yield is due to the low exchange surface in embodiment (2).

Example 5

In this example, just as in example 4, extraction tests are carried out in which the ligand, extractant is placed in a supercritical $CO_2$ medium.

But in this example the tests are carried out in dynamic mode, in dynamic conditions, in order to favour contact between the ligand and the catalyst and thus improve the extraction yields.

The experimental installation used for these tests is analogous to that represented in FIG. 2 already described above. It consists of the following main elements:
 a $CO_2$ pump with cooling by Peltier effect, flow rate: 0.001 to 10 mL·min$^{-1}$;
 a 35 mL reactor for the solubilisation of the ligand, maximum acceptable pressure:
 50 MPa, maximum temperature 300° C.;
 a 60 mL extraction reactor enabling the ligand and the catalyst to be brought into contact up to a pressure of 35 MPa—150° C.;
 a 50 mL collection vessel enabling the recovery of the metal complexes.

The ligand is introduced into the solubilisation reactor and the supported catalyst consisting of metal particles dispersed on a porous support is introduced into the extraction reactor.

The flow of $CO_2$ passes through the first reactor, carrying away (sweeping along) the ligand which is then brought into contact with the catalyst in the second reactor. The complex formed is then swept along and recovered in the collection vessel. The tests in dynamic mode were carried out at 60° C. and 250 bars.

FIG. 9 shows the effect of the flow rate of $CO_2$ on the extraction yield of Pd supported on an alumina support for an extraction carried out with dodecanethiol in supercritical $CO_2$ medium in dynamic mode for a duration of 3 h at 250 bars and 60° C.

This FIG. 9 shows the necessity of working at low flow rates to favour solubilisation of the ligand in $CO_2$ and ligand/catalyst contact by increasing the residence time of the ligand is retained in the extraction reactor.

All the following tests were thus carried out with a flow rate of $CO_2$ of 0.5 mL/min.

The kinetic of extraction of Pd by dodecanethiol, at 60° C. and 250 bars and a flow rate of 0.5 L/min, was then determined (FIG. 10).

The extraction yield of Pd at the end of 5 h of treatment in these conditions is equivalent to that obtained for an extraction duration of 5 h at 60° C. in a beaker, and lies around 35%.

For Pt, the extraction yield by dodecanethiol in supercritical $CO_2$ is also equivalent to that determined for an extraction duration of 5 h at 60° C. in a beaker, and lies around 20%.

To illustrate the effect of the operating conditions, different filling rates of the extraction reactor with beads of supported catalyst were tested.

Thus, either 2 g, or 10 g of supported catalyst were introduced into the extraction reactor, for the same quantity of ligand implemented.

By increasing the quantity of material to treat, the yield drops but the weight of metal extracted is for its part greater, as shown in FIG. 11.

This result seems to show that the ligand is not saturated with metal during its passage through the column of catalyst beads.

The invention claimed is:

1. A method of selective extraction of a metal of the family of platinoids, from a ceramic support containing said metal, comprising the following successive steps:
   a) said ceramic support containing said metal is brought into contact, in an extraction chamber, with an extraction medium consisting of a pressurized dense fluid and of an organic ligand that is selective for the metal and that is capable of forming a complex with said metal in the 0 state; whereby the complex with said metal in the 0 state is formed, and a ceramic support depleted in said metal, or, optionally, free of said metal, and a medium consisting of the pressurized dense fluid containing the complex of the organic ligand with the metal in the 0 state are obtained;
   b) said pressurized dense fluid containing the complex of the organic ligand with the metal in the 0 state is brought back to atmospheric pressure and to ambient temperature, whereby the complex of the organic ligand with the metal in the 0 state separates from the fluid;
   c) the ceramic support depleted in said metal, or, optionally free of said metal, and the complex of the organic ligand with the metal in the 0 state, are recovered,
      wherein the pressurized dense fluid is at a pressure of 50 to 700 bars, and at a temperature from 15° C. to 200° C., and
      wherein the organic ligand that is selective for the metal is selected from thiols of formula RSH, in which R represents a linear or branched alkyl group of 1 to 20 C.

2. A method according to claim 1, wherein the metal of the family of platinoids is selected from the group consisting of platinum, palladium, rhodium, ruthenium, gold, silver, and alloys and mixtures thereof.

3. A method according to claim 1, wherein the metal is in the form of nanoparticles dispersed on at least one external surface of the ceramic support and the metal is extracted in the form of nanoparticles of the metal in the (0) metal state.

4. A method according to claim 1, wherein the fluid is selected from the group consisting of carbon dioxide; helium; xenon; nitrogen; nitrous oxide; sulphur hexafluoride; gaseous alkanes of 1 to 5 carbon atoms; gaseous fluorinated hydrocarbons; gaseous chlorinated and/or fluorinated hydrocarbons; ammonia; and mixtures thereof.

5. A method according to claim 1, wherein the pressurized dense fluid is in the liquid state, dense gas state, or in the supercritical state.

6. A method according to claim 1, wherein the organic ligand that is selective for the metal represents from 1 to 20% by weight of the extraction medium.

7. A method according to claim 1, wherein, simultaneously to being brought into contact, the support and/or the extraction medium are subjected to a mechanical action.

8. A method according to claim 7, wherein the mechanical action is selected from the group consisting of one or more among an agitation, a turbulence, a shear, an electromechanical action and an ultrasonic action.

9. A method according to claim 1, which further comprises, at the end of step c), a step d) during which the metal is recovered from the complex.

10. A method according to claim 9, wherein the metal is recovered from the complex by thermal treatment of the complex.

11. A method according to claim 1, which is carried out in static mode, and which further comprises, prior to step a), a step a1):
   a1) the ceramic support containing the metal, and the organic ligand that is selective for the metal and that is capable of forming a complex with said metal in the 0 state are placed in the extraction chamber, then the fluid is introduced into the extraction chamber, and a temperature and a pressure are established in the extraction chamber such that the fluid is dense and pressurized;
and wherein, during step b), the pressure in the extraction chamber is brought back to atmospheric pressure, the temperature is brought back to ambient temperature, the fluid is evacuated from the extraction chamber in the form of a stream of gas, the complex is carried away with the stream of gas, and optionally the complex is recovered in a separator placed at the outlet of the extraction chamber.

12. A method according to claim 11, wherein during step a) the ceramic support containing the metal is brought into contact with the extraction medium for a duration of 1 to 24 hours.

13. A method according to claim 11, wherein the proportion by weight of the ceramic support containing the metal compared to the volume of selective organic ligand is 0.01 g/mL to 0.5 g/mL.

14. A method according to claim 11, wherein during step a1) the ceramic support containing said metal and the selective organic ligand are placed in the extraction chamber in such a way that the ceramic support containing the metal and the selective organic ligand are in direct contact.

15. A method according to claim 11, wherein during step a1) the ceramic support containing said metal and the selective organic ligand are placed in the chamber in such a way that the ceramic support containing the metal and the selective organic ligand are not in direct contact.

16. A method according to claim 1, which is carried out in dynamic mode, and which further comprises, prior to step a), steps a1), a2), and a3):
   a1) the selective organic ligand is placed in a solubilization chamber in fluidic communication with the extraction chamber, and the ceramic support containing the metal is placed in the extraction chamber; then
   a2) a stream of pressurized dense fluid is sent continuously into the solubilization chamber, whereby is obtained the extraction medium consisting of the pressurized dense fluid and of the selective organic ligand;
   a3) a stream of the extraction medium is sent continuously into the extraction chamber;
and wherein, at the end of step a), a stream of the pressurized dense fluid containing the complex of the organic ligand with the metal in the 0 state is drawn off from the extraction chamber and sent into a reservoir in which steps b) then c) are carried out.

17. A method according to claim 16, wherein, during step b), the pressure in the reservoir is brought back to atmospheric pressure, the temperature is brought back to ambient temperature and the fluid is evacuated from the reservoir in the form of a gas whereas the complex of the organic ligand with the metal in the 0 state remains in the reservoir.

18. A method according to claim 1, wherein R represents a linear or branched alkyl group of 1 to 12 C.

* * * * *